United States Patent Office 2,748,116
Patented May 29, 1956

2,748,116

ARYLCYCLOALKYLOXYALKYLAMINE DERIVATIVES AND METHODS FOR THEIR PREPARATION

John W. Cusic, Skokie, and Clinton A. Dornfeld, Mundelein, Ill., assignors, by mesne assignments, to G. D. Searle & Co., Skokie, Ill., a corporation of Delaware No Drawing. Application December 20, 1951,
Serial No. 262,664

2 Claims. (Cl. 260—247.7)

This invention relates to aromatic-alicyclic ethers of aminoalkanols, to salts thereof, and to processes for preparing such compounds. More particularly, this invention relates to compounds having the following general formula $(Ar)_xR$—O—Alk—B wherein Ar is an aromatic hydrocarbon radical, $x$ is an integer from 1 to 3, R is an alicyclic hydrocarbon nucleous, Alk is a lower alkylene radical, and B is an organic non-aromatic amino radical.

In the foregoing formula, Ar represents an aromatic radical such as phenyl, tolyl, xylyl, naphthyl, xenyl, and related radicals, R represents a cyclic aliphatic hydrocarbon nucleous such as that derived from cyclohexane, cyclohexene, cycloheptane, cyclopentane, cyclopentene and cyclopentadiene by the introduction of one or more aryl radicals, and Alk represents lower alkylene radicals containing 2 to 6 carbon atoms and having at least 2 carbon atoms between the oxygen and amine linkages, preferably 2 or 3 carbon atoms. The alkylene radical may be straight or branched chained. B represents aliphatic and aliphatic-type organic amino radicals such as monoalkylamino and dialkylamino radicals, wherein the alkyl substituent contains 1 to 5 carbon atoms, and heterocyclic amino radicals wherein the amino nitrogen atom is aliphatic in character. In the latter group are included morpholino, pyrrolidino, piperidino, thiamorpholino, piperazino, lupetidino, and related cyclic amino radicals. Among the former group are hydroxyalkylamino radicals such as ethanolamino, isopropanolamino, methylethanolamino, ethylethanolamino, and related aliphatic amino radicals wherein 1 or more of the aliphatic substituents carries 1 or more hydroxyl radicals. The amino radical, B, is derived from an aliphatic or aliphatic-type amine having a basic dissociation constant in the range of $10^{-3}$ to $10^{-5}$.

The compounds of this invention are prepared by reacting an alcohol of the general formula $(Ar)_xR$—OH wherein Ar, $x$ and R have the meanings given hereinabove, with an aminoalkyl ester of the formula B—Alk—X wherein B and Alk have the meanings given hereinabove and X represents halogen or the anionic moiety of an aromatic or aliphatic sulfonic acid such as ethane sulfonic acid, methane sulfonic acid, benzene sulfonic acid, toluene sulfonic acid, and the like. These condensations are preferably carried out in inert solvents such as hydrocarbons boiling in the range of 50–150° C., high-boiling ethers, and other inert solvents, using as a condensation agent an alkali metal, an alkali metal alkoxide, an alkali metal amide, or an alkali metal hydride. Preferred condensation agents are sodium hydride, lithium hydride, sodium ethoxide, sodium methoxide, potassium ethoxide, potassium methoxide, sodamide, lithium amide, and sodium metal. The alkaline condensation agent is caused to react with the aromatic alicyclic alcohol to form an alkali metal salt thereof, and then the aminoalkyl ester is added in approximately equivalent amounts, with heating and agitation in the range of 80–150° C. The resulting organic base is isolated from the reaction mixture by conventional procedures such as extraction with mineral acids or evaporation and distillation. The 1-arylcycloalkanol ethers can be prepared by the following method. An alkali metal derivative of the aromatic hydrocarbon, such as phenyllithium, is condensed with a cycloalkanone and the resulting addition complex, i. e. the alkali metal 1-arylcycloalkanoxide is then directly heated with the aminoalkyl ester of the formula B—Alk—X in an inert organic solvent to yield the ether which is isolated as described above.

Representative of the substances within the scope of this invention are the following:

A. 4-phenylcyclohexyl β-diethylaminoethyl ether

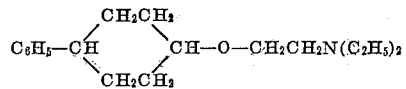

B. 2,4-diphenylcyclohexyl β-dimethylaminoethyl ether

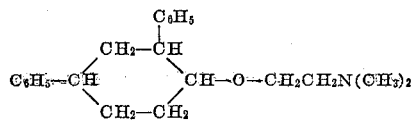

C. 2,6-diphenylcyclohexyl β-diethylaminoethyl ether

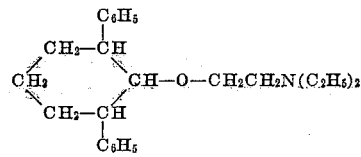

D. 2-phenylcyclohexyl β-dimethylaminopropyl ether

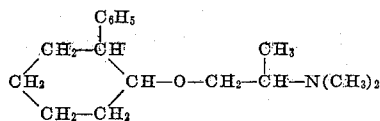

E. 4-phenylcyclohexyl β-piperidinoethyl ether

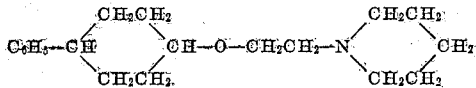

F. 4-phenylcyclohexyl β-morpholinoethyl ether

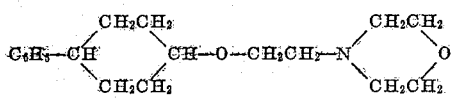

G. 2,4,6 - triphenylcyclohexyl γ - diethylaminopropyl ether

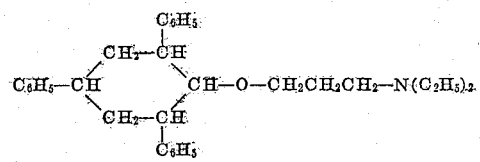

H. 2-phenylcyclopentyl β-diethylaminopropyl ether

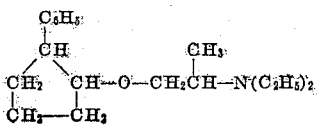

I. 2,5-diphenylcyclopentyl β-dimethylaminoethyl ether

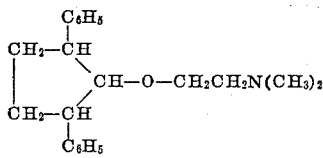

J. 4-α-naphthylcyclohexyl β-diethylaminopropyl ether

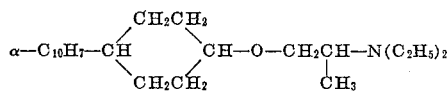

K. 4-p-tolylcyclohexyl β-ethylethanolaminoethyl ether

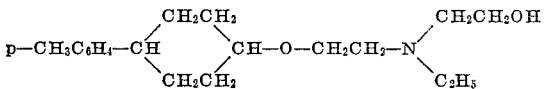

L. 2-phenylcyclohexyl β-diethylaminoethyl ether

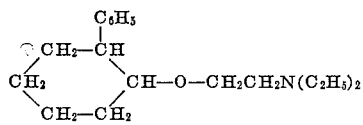

M. 2-phenylcyclohexyl γ-diethylaminopropyl ether

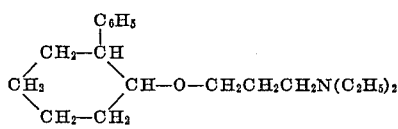

N. 1-phenylcyclohexyl β-diethylaminoethyl ether

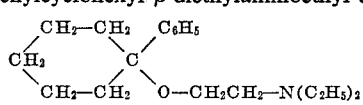

O. 2-phenylcyclohexyl ω-dimethylaminohexyl ether

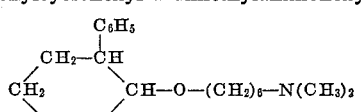

P. 1-phenylcyclopentyl β-diethylaminoethyl ether

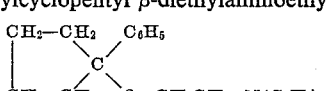

The compounds of this invention form salts with strong organic or inorganic acids, which salts are generally readily soluble in water and comprise a preferred embodiment of this invention. Among the acids which are useful in forming such salts are hydrochloric, hydrobromic, sulfuric, phosphoric, sulfamic, tartaric, citric, acetic, benzoic, maleic, malic, lactic, boric, and related acids, which are non-toxic in dosages at therapeutic levels. Quaternary ammonium salts of the organic bases of this invention are generally readily prepared and constitute a useful form of the invention. Such salts can be made with alkyl or hydroxyalkyl halides such as methyl chloride, methyl bromide, methyl iodide, ethyl bromide, propyl chloride, ethylene bromohydrin, propylene bromohydrin, glycerol monochlorohydrin, and related aliphatic halides. Quaternary bases may also be prepared from arylmethyl halides such as benzyl chloride, naphthylmethyl chloride, and the like. Aliphatic esters of sulfuric acid or aromatic sulfonic acids are also suitable, as for example, dimethyl sulfate, diethyl sulfate, ethyl toluenesulfonate, and propyl benzenesulfonate.

The compounds of this invention are useful in the preparation of medicinal agents. The compounds are useful because of their antihistaminic, antispasmodic, ganglion blocking, cardiovascular and other pharmacodynamic actions. Our invention is further disclosed by the following examples, which are given merely for the purpose of illustrating specific embodiments of our invention, without limiting it in spirit or in scope. Relative amounts of materials are given in parts by weight, temperatures as degrees centigrade (°C.), and pressures during vacuum distillation in millimeters (mm.) of mercury.

The present application is a continuation-in-part of our copending application Serial No. 68,061, filed December 29, 1948.

*Example 1*

55 parts of trans-4-phenylcyclohexanol (melting point 118–119° centigrade) in 200 parts of dry xylene with 7.8 parts of sodium hydride are heated until reaction occurs. After the initial reaction subsides, the mixture is heated and agitated at 130° C. for 15 hours. It is then cooled to 90° C. and 54.2 parts of β-diethylaminoethyl chloride are added in 80 parts of xylene. After the addition is complete, the mixture is stirred and heated at 130° C. for about 15 hours. The chilled reaction mixture is filtered, extracted with dilute hydrochloric acid, and the acid extract is made alkaline and extracted with ether. The ether solution is dried and stripped of solvent. The residue of trans-4-phenylcyclohexyl diethylaminoethyl ether (compound A) is distilled at 130° C. at 0.2 millimeters pressure. This base forms a crystalline hydrochloride in isopropanol melting at 171–172° C.

*Example 2*

15 parts of trans-4-phenylcyclohexyl β-diethylaminoethyl ether, 20 parts of methyl iodide, and 40 parts of methyl ethyl ketone are mixed and kept at about 0° C. for 15 hours. The reaction mixture is then diluted with ether, chilled, and the crystalline precipitate of trans-4-phenylcyclohexyl β-diethylaminoethyl ether methiodide is separated and crystallized from methyl ethyl ketone. This compound melts at 81–83° C.

*Example 3*

30 parts of cis-4-phenylcyclohexanol and 4.6 parts of lithamide in 175 parts of xylene are treated by dropwise addition with 41 parts of β-chloroethyldiethylamine at 70–100° C. with agitation. The mixture is stirred for 10 hours at 120° C., cooled and filtered. The filtrate is extracted with dilute hydrochloric acid, the extract washed with ether, rendered alkaline and extracted with ether. The ether extract is dried, evaporated and distilled at 9 mm. pressure yielding the cis-4-phenylcyclohexyl β-diethylaminoethyl ether at about 177–187° C. Its hydrochloride melts at about 118–121° C.

*Example 4*

A solution of 100 parts of cis-4-phenylcyclohexyl β-diethylaminoethyl ether and 40 parts of ethyl bromide in 400 parts of methyl ethyl ketone is heated in a shielded pressure reactor for 15 hours at 80° C. After cooling the precipitate is collected on a filter and vacuum dried. The cis-4-phenylcyclohexyl β-diethylaminoethyl ether ethobromide thus obtained melts at about 100–107° C.

*Example 5*

68 parts of trans-2-phenylcyclohexanol are reacted with 9.6 parts of sodium hydride as in Example 1. Then 81 parts of β-diethylaminoethyl chloride in dry toluene are added at 125° C. as in Example 1. The organic base, trans-2-phenylcyclohexyl β-diethylaminoethyl ether, is isolated by the method of Example 1 and distils at 125° C. at 0.15 mm. pressure. This forms a crystalline citrate by reaction with an equivalent amount of citric acid in isopropanol. This salt melts at 92° C. The crystalline hydrochloride is made by the method of Example 1 and melts at 107–109° C.

*Example 6*

To a solution of 352 parts of cis-2-phenylcyclohexanol in 2500 parts of liquid ammonia are added 46 parts of sodium portionwise. The ammonia is allowed to evaporate overnight and the residue is suspended in 800 parts of dry xylene. To the suspension is added a solution of 400 parts of β-diethylaminoethyl chloride in 400 parts of dry xylene. The reaction mixture is maintained at 80° C. during the addition and then at 130° C. for several hours thereafter. The chilled reaction mixture is filtered, and the filtrate is extracted with dilute hydrochloric acid. The acid extract is made alkaline and extracted with ether. From the ether solution there is obtained, after drying and evaporation, cis-2-phenylcyclohexyl β-diethylaminoethyl ether which distils at 130–135° C. at 0.2 mm. pressure. The hydrochloride of this base is prepared by reacting a dry ethereal solution of the base with an alcoholic solution of hydrogen chloride, chilling, and filtering off the crystalline solid. The hydrochloride so prepared melts at 129–131° C.

*Example 7*

A solution of 100 parts of cis-2-phenylcyclohexyl β-diethylaminoethyl ether and 43 parts of ethyl bromide in 750 parts of chloroform is heated in a shielded pressure reactor at 95° C. for 18 hours. After evaporation of the chloroform the oily residue is chilled and treated with ether. The resulting cis-2-phenylcyclohexyl β-diethylaminoethyl ether ethobromide is collected on a filter and washed with ether. It melts at about 116–118° C.

*Example 8*

A mixture of 110 parts of cis-2-phenylcyclohexyl β-diethylaminoethyl ether and 50 parts of ethylene bromohydrin in 400 parts of methyl ethyl ketone is heated for 24 hours at 75° C. and then chilled. The crystals which are obtained in the shape of large and small balls are collected on a filter and dried. The cis-2-phenylcyclohexyl β-diethylaminoethyl ether β-hydroxyethobromide melts at about 90–93° C.

*Example 9*

88 parts of 2-phenylcyclohexanol (commercial product, a mixture of stereo-isomers) are reacted with 13 parts of sodium hydride in 200 parts of dry xylene by the method of Example 1. Then 79 parts of β-methylethylaminoethyl chloride hydrochloride are dissolved in 480 parts of concentrated aqueous ammonia, and the base is extracted with 160 parts of toluene. The toluene solution is thoroughly dried and added in one portion to the above reaction mixture. After the initial exothermic reaction, the mixture is agitated and heated to 105° C. for 15 minutes. The reaction mixture is filtered and the organic base is extracted by the method of Example 1. 2-phenylcyclohexyl β-methylethylaminoethyl ether distils at 125° C. at 0.15 mm. pressure. It forms a crystalline citrate when treated with an equivalent of anhydrous citric acid in isopropanol. This salt melts at about 138° C.

*Example 10*

A mixture of 88 parts of 2-phenylcyclohexanol (commercial product, a mixture of stereo-isomers) and 14.4 parts of sodium hydride are heated at about 100° C. in 200 parts of xylene. After the evolution of hydrogen ceases, the reaction mixture is heated at about 110° C. for 15 hours. Then a solution of 81 parts of β-diethylaminoethyl chloride in 40 parts of dry toluene is added in one portion. The mixture is heated overnight at about 110° C. and then the organic base is extracted and isolated as in Example 1. 2-phenylcyclohexyl β-diethylaminoethyl ether (compound L) distils at 170–174° C. at 8 mm. pressure.

*Example 11*

A solution of 55 parts of 2-phenylcyclohexyl β-diethylaminoethyl ether (Example 10) in 80 parts of methyl ethyl ketone is reacted with 22 parts of methyl chloride at 60° C. in a closed vessel for 15 hours. The reaction mixture is chilled, diluted with ether, and kept at 0° C. until crystals of 2-phenylcyclohexyloxyethyl-diethylmethylammonium chloride precipitate. This crystalline salt is hygroscopic. A sample on anlysis showed 4.34% nitrogen (calculated 4.30%).

*Example 12*

264 parts of 2-phenylcyclohexanol (commercial product, a mixture of stereo-isomers) are reacted with 40 parts of sodium hydride in 400 parts of dry xylene. When the evolution of hydrogen ceases, the reaction mixture is refluxed for one hour, chilled to about 60° C., and 271 parts of β-diethylaminoethyl chloride are added portionwise. After the initial reaction has ceased, the mixture is heated to reflux for several hours. The organic base is isolated by extraction as in Example 1. 2-phenylcyclohexyl β-diethylaminoethyl ether (compound L) distils at 160–170° C. at 7 mm. pressure. It forms a crystalline citrate in isopropanol. A sample of this salt on analysis showed 3.07% nitrogen (calculated, 3.00%).

*Example 13*

By the process of Example 12, 88 parts of 2-phenylcyclohexanol (commercial product, a mixture of stereoisomers) are reacted with 14.4 parts of sodium hydride in 200 parts of dry xylene, and then 75 parts of β-dimethylaminoethyl chloride are added. 2-phenylcyclohexyl β-dimethylaminoethyl ether is isolated as in Example 8 and distils at 119–125° C. at 1.5 mm. pressure. It forms a crystalline hydrochloride melting at 103–105° C.

*Example 14*

44 parts of 2-phenylcyclohexanol (a commercial product, a mixture of stereo-isomers) is reacted with 7.2 parts of sodium hydride in 100 parts of dry xylene by the method of Example 1. Then 49 parts of β-diisopropylaminoethyl chloride are added. The reaction is conducted and worked up by the method of Example 1. There is obtained in this way 2-phenylcyclohexyl β-diisopropylaminoethyl ether which is a nearly colorless fluid oil distilling at about 160–167° C. at 1.8–2.0 mm. pressure.

*Example 15*

To a phenyllithium solution prepared from 2350 parts of bromobenzene and 210 parts of lithium in 5000 parts of anhydrous ether, 980 parts of cyclohexanone are added dropwise while the temperature is maintained at about 10° C. The mixture is permitted to warm up to room temperature after which 205 parts of β-chloroethyldiethylamine are added and the mixture is stirred for 12 hours. Then 1750 parts of xylene are added and the fraction boiling below 130° C. is removed by distillation. An additional quantity of 207 parts of β-chloroethyldiethylamine is added and the mixture stirred for 12 hours. After treatment with water the organic layer is separated and extracted with dilute hydrochloric acid. This extract is rendered alkaline and the oily layer is separated and dried over potassium carbonate. The 1-phenylcyclohexyl β-diethylaminoethyl ether (compound N) is obtained by fractional distillation at 8 mm. pressure and about 165–177° C.

A solution of 200 parts of this base in 3500 parts of anhydrous ether is treated with 11 parts of hydrogen chloride in anhydrous 2-propanol. The resulting hydrochloride melts at about 120–121° C.

*Example 16*

A mixture of 200 parts of 1-phenylcyclohexyl β-diethylaminoethyl ether and 87 parts of ethyl bromide in 400 parts of methyl ethyl ketone is heated in a shielded pressure reactor for 19 hours at 80° C., cooled and diluted with 550 parts of anhydrous ether with stirring. The resulting 1-phenylcyclohexyl β-diethylaminoethyl ether ethobromide is collected on a filter and dried. It melts at about 131–134° C.

Example 17

A solution of 55 parts of 4-phenylcyclohexanol in 200 parts of dry xylene is reacted with 7.8 parts of sodium hydride at 80–85° C. Then 58.2 parts of β-piperidinoethyl chloride in dry xylene are added slowly while the mixture is heated and agitated at 85–120° C. After the addition the mixture is agitated at 120–130° C. for 10 hours, then filtered and chilled. The organic base is extracted with dilute hydrochloric acid. The acid solution is made alkaline and extracted with ether. On evaporation of the ether extract there is obtained 4-phenylcyclohexyl β-piperidinoethyl ether (compound E) as a light-colored oil which distils at about 135–140° C. at 0.2 mm. pressure.

Example 18

By the procedure of Example 17, but using 59.8 parts of β-morpholinoethyl chloride, there is produced 4-phenylcyclohexyl β-morpholinoethyl ether (compound F). This is a light-colored oil which can be distilled under reduced pressure at about 128–133° C. at 0.15 mm. pressure.

Example 19

52.8 parts of cis-2-phenylcyclohexanol and 9.2 parts of lithium amide are heated with agitation in 250 parts of xylene to about 85° C. and then 67.8 parts of β-diethylamionethyl chloride are added slowly while the mixture is heated at 80–120° C. After the addition is complete, the reaction mixture is agitated and heated at 130° C. for about 15 hours. The mixture is then filtered, chilled and extracted with dilute hydrochloric acid. The acid solution is washed with ether and then made alkaline. The alkaline solution is extracted with ether. The ether extract is dried with anhydrous potassium carbonate, filtered and evaporated. The residue of cis-2-phenylcyclohexyl β-diethylaminoethyl ether is distilled under reduced pressure. It is distilled through a distilling column at about 109° C. at 0.2 mm. pressure and has a refractive index at 24° C. of 1.5037.

Example 20

88 parts of 2-phenylcyclohexanol are reacted with 13 parts of sodium hydride in 250 parts of dry xylene as in Example 17. Then 97.5 parts of γ-diethylaminopropyl chloride are added slowly in xylene to the reaction mixture at 80–90° C. The mixture is then heated to 120–130° C. for 12 hours. It is filtered hot, chilled and extracted with dilute hydrochloric acid. From the acid extract there is isolated by alkalinization, extraction with ether, evaporation and distillation, 2-phenylcyclohexyl γ-diethylamino-propyl ether (compound M) as a nearly colorless oil; its boiling range is about 129–135° C. at 0.1 mm. pressure.

Example 21

By the procedure of Example 20, using 79 parts of β-dimethylaminopropyl chloride in place of the γ-diethylaminopropyl chloride, there is produced 2-phenylcyclohexyl β-dimethylaminopropyl ether (compound D). This base is a light-colored oil which distils at about 121–125° C. at 0.1 mm. pressure.

Example 22

A mixture of 100 parts of 2-phenylcyclohexanol (commercial mixture of stereo-isomers) and 16.4 parts of sodium hydride is heated at about 95° C. in 250 parts of xylene. Upon cessation of the evolution of hydrogen, the reaction mixture is heated at about 120° C. for 12 hours, after which it is treated with 137 parts of ω-chlorohexyl-dimethylamine and 100 parts of xylene is added. This mixture is heated for 15 hours at 120° C., chilled, filtered and treated with dilute hydrochloric acid. The aqueous layer is separated, washed with ether, rendered alkaline and extracted with ether. This ether extract is dried and evaporated. The oily residue yields the 2-phenylcyclohexyl ω-dimethylaminohexyl ether (compound O) which distils at about 150–158° C. and 1 mm. pressure.

Example 23

To a phenyllithium solution prepared from 2350 parts of bromobenzene and 210 parts of lithium in 4300 parts of ether, 84 parts of cyclopentanone are added dropwise at about 10–20° C. with cooling in the course of 90 minutes. Stirring is continued while the mixture is permitted to rise to room temperature. Xylene is added and the ether and benzene are distilled off. At 60° C. 2000 parts of β-chloroethyldiethylamine are added. After distillation of the low boiling material an additional quantity of 2000 parts of β-chloroethyldiethylamine is added and the reaction mixture is worked up as in Example 15 to yield the 1-phenylcyclopentiyl β-diethylaminoethyl ether (compound P).

Example 24

570 parts of 4-benzylcyclohexanol and 84 parts of sodium hydride in 2600 parts of xylene are heated slowly to 130° C. and maintained at that temperature for 14 hours. Then 680 parts of β-chloroethyldiethylamine in 860 parts of xylene are added dropwise. The mixture is stirred at 130° C. for 12 hours and then filtered. The filtrate is treated with dilute hydrochloric acid and the acid layer is separated, washed with ether, rendered alkaline and then extracted with ether. This ether extract is dried and evaporated. From the residue the 4-benzylcyclohexyl β-diethylaminoethyl ether is obtained by fractional distillation at about 133–144° C. and 0.2 mm. pressure. The hydrochloride, obtained as in Example 1, melts at about 128–135° C.

Example 25

A solution of 289 parts of 4-benzylcyclohexyl β-diethylaminoethyl ether and 107 parts of ethyl bromide in 400 parts of methyl ethyl ketone are heated at 90° C. for 12 hours. The resulting crystalline mass is treated with ether, disintegrated and collected on a filter. The 4-benzylcyclohexyl β-diethylaminoethyl ether ethobromide melts at about 128° C.

Example 26

415 parts of 4-benzylcyclohexanol are treated with 60 parts of sodium hydride in xylene and then reacted with 54 parts of β-chloroethyldimethylamine as in Example 23. The 4-benzylcyclohexyl β-dimethylaminoethyl ether is distilled at 0.7 mm. pressure and about 145–150° C. A crystalline hydrochloride is obtained which melts at about 130–136° C.

Example 27

450 parts of 1-benzylcyclohexanol and 92 parts of lithamide in 220 parts of xylene are stirred and heated to 100° C. and then treated by dropwise addition of 678 parts of β-chloroethyldiethylamine in 400 parts of xylene at 100–130° C. Heating and stirring is continued at 120° C. for 2 hours after which the mixture is cooled and filtered and the filtrate is extracted with dilute hydrochloric acid. The acidic extract is washed with ether, rendered alkaline and extracted with ether. The ether solution is dried and evaporated and the residual oil distilled at 0.2 mm. pressure. The benzylcyclohexyl β-diethylaminoethyl ether is obtained at about 145–150° C. The hydrochloride melts at about 115–117° C.

Example 28

A solution of 280 parts of 1-benzylcyclohexyl β-diethylaminoethyl ether and 88 parts of ethyl bromide in 750 parts of chloroform is heated in a sealed pressure vessel at 70° C. for 24 hours and then cooled and treated with anhydrous ether. The resulting precipitate is collected on the filter, washed with ether and dried. The 1-benzylcyclohexyl β-diethylaminoethyl ether ethobromide melts at about 145–148° C.

We claim:
1. The process of preparing a compound of the structural formula

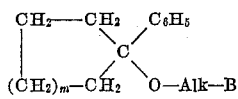

wherein m is a positive integer smaller than 3, Alk is an alkylene radical containing at least two and not more than four carbon atoms and B is an amino radical selected from the group consisting of N-piperidino, N-morpholino and di(lower alkyl)-amino radicals, which comprises mixing of a cycloalkanone of the structural formula

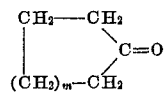

with a phenyl-(alkali metal) compound, followed by heating of the reaction mixture with a compound of the structural formula Halogen—Alk—B 2. The process of preparing a compound of the structural formula

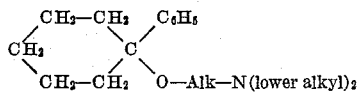

wherein Alk is a lower alkylene radical containing at least two carbon atoms which comprises mixing of cyclohexanone and phenyllithium followed by heating of the reaction mixture with a compound of the structural formula Halogen—Alk—N(lower alkyl)$_2$

References Cited in the file of this patent
FOREIGN PATENTS 484,906    Great Britain  ----------- May 7, 1938